(12) United States Patent
Leber

(10) Patent No.: US 11,222,314 B2
(45) Date of Patent: Jan. 11, 2022

(54) SYSTEMS AND METHODS FOR SECURING ELECTRONIC TRANSACTIONS

(71) Applicant: Hurricane Electric, Fremont, CA (US)

(72) Inventor: Mike Leber, Fremont, CA (US)

(73) Assignee: Hurricane Electric, Fremont, CA (US)

( * ) Notice: Subject to any disclaimer, the term of this patent is extended or adjusted under 35 U.S.C. 154(b) by 0 days.

(21) Appl. No.: 16/452,011

(22) Filed: Jun. 25, 2019

(65) Prior Publication Data

US 2019/0318324 A1    Oct. 17, 2019

Related U.S. Application Data

(63) Continuation of application No. 13/401,748, filed on Feb. 21, 2012, now abandoned.

(51) Int. Cl.
*G06Q 20/02* (2012.01)
*G06Q 20/38* (2012.01)

(52) U.S. Cl.
CPC ......... *G06Q 20/023* (2013.01); *G06Q 20/385* (2013.01)

(58) Field of Classification Search
CPC .. G06Q 20/023; G06Q 20/385; G06Q 20/405; G06Q 20/401
USPC .......................................................... 705/44
See application file for complete search history.

(56) References Cited

U.S. PATENT DOCUMENTS

| | | | |
|---|---|---|---|
| 5,774,869 A | 6/1998 | Toader | |
| 6,215,412 B1 | 4/2001 | Franaszek et al. | |
| 6,505,240 B1 | 1/2003 | Blumenau | |
| 6,532,450 B1 | 3/2003 | Brown et al. | |
| 6,708,219 B1 | 3/2004 | Borella et al. | |
| 6,757,255 B1 | 6/2004 | Aoki et al. | |
| 7,512,547 B2 | 3/2009 | Ash | |
| 7,644,171 B2 | 1/2010 | Sturniolo et al. | |
| 8,180,901 B2 | 5/2012 | Bagepalli et al. | |
| 8,255,323 B1 | 8/2012 | Casey et al. | |
| 8,402,153 B2 | 3/2013 | Friedman | |
| 8,990,956 B2 | 3/2015 | Leber | |
| 9,965,760 B2 | 5/2018 | Leber | |
| 10,320,951 B2 | 6/2019 | Leber | |
| 2002/0012320 A1 | 1/2002 | Ogier et al. | |
| 2003/0135461 A1 | 7/2003 | Brown et al. | |
| 2003/0233455 A1 | 12/2003 | Leber et al. | |
| 2004/0133463 A1 | 7/2004 | Benderev | |
| 2005/0055319 A1 | 3/2005 | Monsen et al. | |
| 2005/0071219 A1 | 3/2005 | Kahlert et al. | |
| 2005/0273438 A1 | 12/2005 | Yen et al. | |
| 2006/0224509 A1 | 10/2006 | Walker et al. | |
| 2006/0256716 A1 | 11/2006 | Caci | |
| 2007/0104099 A1 | 5/2007 | Mutnuru et al. | |
| 2007/0162746 A1 | 7/2007 | Kwon et al. | |
| 2007/0199043 A1 | 8/2007 | Morris | |
| 2008/0109278 A1 | 5/2008 | Rao | |
| 2008/0162315 A1 | 7/2008 | Rampell et al. | |
| 2008/0162350 A1 | 7/2008 | Allen-Rouman et al. | |

(Continued)

*Primary Examiner* — Lindsay M Maguire
(74) *Attorney, Agent, or Firm* — Carr & Ferrell LLP

(57) ABSTRACT

Systems and methods for facilitating at least a portion of a secure electronic financial transaction are provided herein. Methods may include generating a unique payee identifier that represents a unique payment relationship between a payee and one or more payors, receiving a transaction request, the transaction request comprising the unique payee identifier and a payment, and authorizing a payment to the payee that corresponds to the payment.

20 Claims, 4 Drawing Sheets

(56) References Cited

U.S. PATENT DOCUMENTS

| | | |
|---|---|---|
| 2008/0304482 A1 | 12/2008 | Grassi et al. |
| 2009/0016253 A1 | 1/2009 | Lewis et al. |
| 2009/0037277 A1 | 2/2009 | Zuckerberg et al. |
| 2009/0190586 A1 | 7/2009 | Kim |
| 2009/0199070 A1 | 8/2009 | Haymes et al. |
| 2009/0248800 A1 | 10/2009 | Chu et al. |
| 2009/0254984 A1 | 10/2009 | Nice et al. |
| 2009/0327412 A1 | 12/2009 | Lepeska |
| 2010/0077095 A1 | 3/2010 | Wong et al. |
| 2010/0182145 A1 | 7/2010 | Ungari |
| 2010/0312702 A1 | 12/2010 | Bullock |
| 2011/0022711 A1 | 1/2011 | Cohn |
| 2011/0023105 A1 | 1/2011 | Islam et al. |
| 2011/0154319 A1 | 6/2011 | Carter-Schwendler et al. |
| 2011/0206043 A1 | 8/2011 | Williams |
| 2011/0276699 A1 | 11/2011 | Pedersen |
| 2011/0302408 A1 | 12/2011 | McDermott et al. |
| 2012/0089471 A1 | 4/2012 | Comparelli |
| 2012/0140018 A1 | 6/2012 | Pikin et al. |
| 2012/0203697 A1 | 8/2012 | Morgan et al. |
| 2012/0203701 A1 | 8/2012 | Ayuso de Paul |
| 2012/0209749 A1 | 8/2012 | Hammad et al. |
| 2012/0215690 A1 | 8/2012 | Grinberg et al. |
| 2012/0259988 A1 | 10/2012 | Erringer |
| 2012/0290415 A1 | 11/2012 | Itwaru |
| 2013/0024255 A1 | 1/2013 | Mittereder et al. |
| 2013/0080618 A1 | 3/2013 | Balwani |
| 2013/0111002 A1 | 5/2013 | Leber |
| 2013/0124412 A1 | 5/2013 | Itwaru |
| 2013/0218768 A1 | 8/2013 | Leber |
| 2014/0006281 A1 | 1/2014 | Leber |
| 2014/0041015 A1 | 2/2014 | Leber |
| 2014/0073356 A1 | 3/2014 | Siomina et al. |
| 2015/0172135 A1 | 6/2015 | Coppola et al. |

SYSTEMS AND METHODS FOR SECURING ELECTRONIC TRANSACTIONS

CROSS-REFERENCE TO RELATED APPLICATION

Field of the Technology

The present application is a continuation application of U.S. patent application Ser. No. 13/401,748 filed Feb. 21, 2012, and entitled "Systems and Methods for Facilitating Secured Financial Transactions," which is hereby incorporated by reference.

FIELD OF THE TECHNOLOGY

Embodiments of the disclosure relate to the facilitation of secure transactions. More specifically, but not by way of limitation, the present technology may be utilized to facilitate secure transactions between parties.

BACKGROUND OF THE DISCLOSURE

Current methods for processing financial transactions utilizing financial instruments such as checks and credit cards are woefully ineffective in preventing fraud. As such, fraudulent transactions may be conducted by a fraudster by obtaining relevant account information and using the same in a manner which is unauthorized by the legitimate account holder.

In some instances, enterprises may employ different types of heuristics to attempt to determine if a transaction is fraudulent. For example, it may be determined that because a credit card was utilized in separate locations that are located across the country from one another and within a specified time frame, that at least one of the transactions may be fraudulent. In other instances, enterprises may not employ any fraud detection measures. Customers may be subject to time intensive and laborious efforts in order to recover their money lost during a fraudulent transaction.

SUMMARY OF THE DISCLOSURE

According to some embodiments, the present technology may be directed to methods for facilitating at least a portion of a secure electronic financial transaction. Methods may include: (a) generating a unique payee identifier that represents a payee; (b) receiving a transaction request, the transaction request comprising an instrument that has been digitally signed by at least one payor and the unique payee identifier; and (c) authorizing a payment to the payee according to payment instructions included in the instrument.

According to additional embodiments, the present technology may be directed to systems facilitating at least a portion of a secure electronic financial transaction. The systems may comprise: (a) a memory for storing executable instructions; (b) a processor for executing the instructions stored in memory; (c) an identification generator stored in memory and executable by the processor to generate a unique payee identifier that represents a payee; (d) a communications module stored in memory and executable by the processor to receive a transaction request, the transaction request comprising an instrument that has been digitally signed by at least one payor and the unique payee identifier; and (e) a transaction authorization module stored in memory and executable by the processor to authorize a payment to the payee according to payment instructions included in the instrument.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
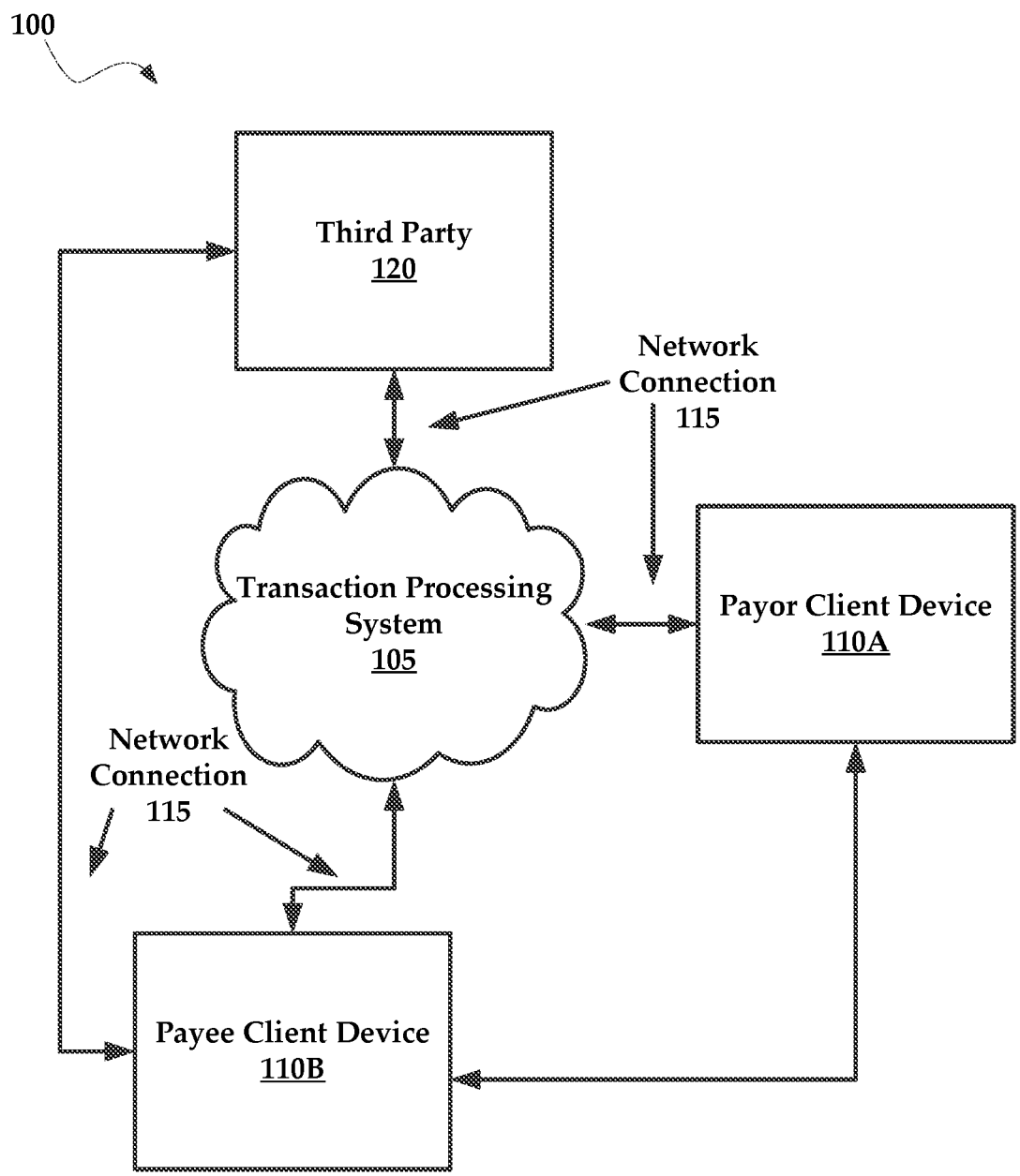
FIG. 1 illustrates an exemplary system for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally described, the present technology may be directed to systems and methods for facilitating at least a portion of a secure financial transaction. More specifically, but not by way of limitation, the present technology may facilitate at least a portion of a secured financial transaction such as transaction request authentication, payment authorization, and/or payment transmission.

Broadly speaking, the present technology may be implemented within the context of a third party transaction processor that is configured to securely process financial transactions on behalf of both payor(s) and payee(s). It is noteworthy that in some instances, the present technology may also comprise the financial institution (e.g., bank) that transmits monetary assets to the payee in response to the authorization of payment to the payee.

The present technology may generate a unique payee identifier, hereinafter "UPI," that is utilized to verify the identity of a payee before authorization of a payment to a payee.

The present technology may also generate digital instruments that represent a unique payment relationship between a payee and one or more payors. In some instances, a payor such as a customer may desire to execute a secure financial transaction with a payee such as a merchant. The digital instrument may include payment instructions that define how payments to the payee are authorized. For example, the digital instrument may specify the type of information (such as name, address, account number, etc.) that must be gathered from the payor before payment can be authorized.

The payment instructions may allow for multiple transactions between the parties, as long as the transactions comport with the payment instructions. For example, the payment instructions may specify that a payment amount may be requested and provided to the payee within a specified period of time. Advantageously, payment instructions may allow for installment payments, pre-dated payments, or other temporally based payments between payors and payees. Other variations on payment instructions will be discussed in greater detail infra.

In addition to the use of an UPI, the present technology may also employ security measures such as cryptography that allow payors to digitally sign the digital instruments. The payor and/or payee may utilize a program and/or digital security protocol that can be used to verify the identity of the payor and/or payee and digitally sign a digital instrument. For example, the present technology may utilize pretty good privacy (PGP) encryption or other encryption mechanisms such as a secure socket layer (SSL), tokenization, along with any other suitable encryption/decryption systems and processes that would be known to one of ordinary skill in the art with the present disclosure before them.

In general, a digital instrument may comprise a set of payment instructions that govern the manner with which financial transactions between a payor and a payee are conducted by the payment processor. That is, payment instructions may include a specific set of rules that are defined by the payor and/or the payee. In some instances, the payment processor may specify the type of payment information that should be obtained from the payor and/or payee. Also, the payment processor may establish one or more required types of cryptographic or tokenization processes that may be employed by the payor and/or payee.

In some embodiments, the payment information may incorporate the use of standard commercial agreements and/or negotiable financial instruments. Examples of these agreements include a check, a wire, a cashier's check, card-present credit card terms, card-not-present credit card terms, automated clearing house terms, an escrow agreement, a contract, a bill, a letter of intent, a purchase order, a promissory note, and a mortgage—just to name a few. In other embodiments, the payment information may include only sections of one or more of the aforementioned agreements.

The present technology may receive a transaction request from either the payor or the payee. At a minimum, the transaction request may comprise a digital instrument that has been digitally signed, along with a unique payee identifier. Again, the digital instrument may include payment instructions.

Once the present technology has processed the transaction request, the present technology may authorize a payment to the payee that corresponds to the payment instructions. It is noteworthy that authorization of the payment may not include an actual transfer of funds to the payee. For example, authorization may include communication of an authorization signal from the payment processor to a financial institution such as a bank. Alternatively, if the payment processor and the financial institution are the same entity, authorization of payment may result in the immediate transfer of funds to the payee.

In some instances the present technology may allow for a payment to be split or apportioned amongst multiple payors. In other embodiments the present technology may allow for payors to act as guarantors for other parties, such as another payor or a third party.

Additionally, while the present technology may be utilized within the context of secured electronic payments for actual monetary consideration, the present technology may also be applied to virtual currency systems such as those utilized in video gaming environments or other types of virtual social constructs (e.g., social networking).

These and other advantages of the present technology will be described in greater detail with reference to the collective FIGS. 1-4.

FIG. 1 illustrates an exemplary system 100 for practicing aspects of the present technology. The system 100 may include a transaction processing system 105 that may be implemented in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the transaction processing system 105 may include a distributed group of computing devices such as web servers that do not share computing resources or workload. Additionally, the transaction processing system 105 may include a single computing system that has been provisioned with a plurality of programs that each produces instances of event data.

Payors and payees may communicate transaction data (e.g., digital instruments) between one another and/or the transaction processing system 105 via individual client devices such as payor client device 110A and payee client device 110B. The transaction processing system 105 may communicatively couple with the payor client device 110A and payee client device 110B via a network connection 115. The network connection 115 may include any one of a number of private and public communications mediums such as the Internet. As mentioned briefly above, the payor client device 110A and the payee client device 110B may utilize PGP, SSL, or another suitable cryptographic protocol for transmitting transaction information between each other and/or the transaction processing system 105.

In some embodiments, payor client device 110A and payee client device 110E may communicate with the transaction processing system 105 using a secure application programming interface or API. An API allows various types of programs to communicate with one another in a language (e.g., code) dependent or language agnostic manner.

The transaction processing system 105 may also communicate with a third party 120 such as a financial institution that may provide monetary funds to a payee, often using the payee's account associated with the payee's financial institution of choice. The transaction processing system 105 and the third party 120 may also communicate via the network connection 115, which may comprise any one of a number of secure/insecure communications protocols.

The transaction processing system 105 may be generally described as a system for facilitating at least a portion of a secure financial transaction. It is noteworthy that the system may facilitate at least a portion of a secure financial transaction as the system may in some instances authorize a payment, whereas in other instances the system may also transmit payment to the payee as well.

The transaction processing system 105 may facilitate at least a portion of a secure financial transaction by generating a UPI for each payee. Also, the transaction processing system 105 may receive a transaction request, where the transaction request may comprise at least the UPI and a digital instrument that has been digitally signed by at least one payor. Advantageously, the digital instrument may include payment instructions such as the payment amount. It is noteworthy that the transaction request may be received from either the payor or the payee, as will be described in greater detail below.

Figure 2:
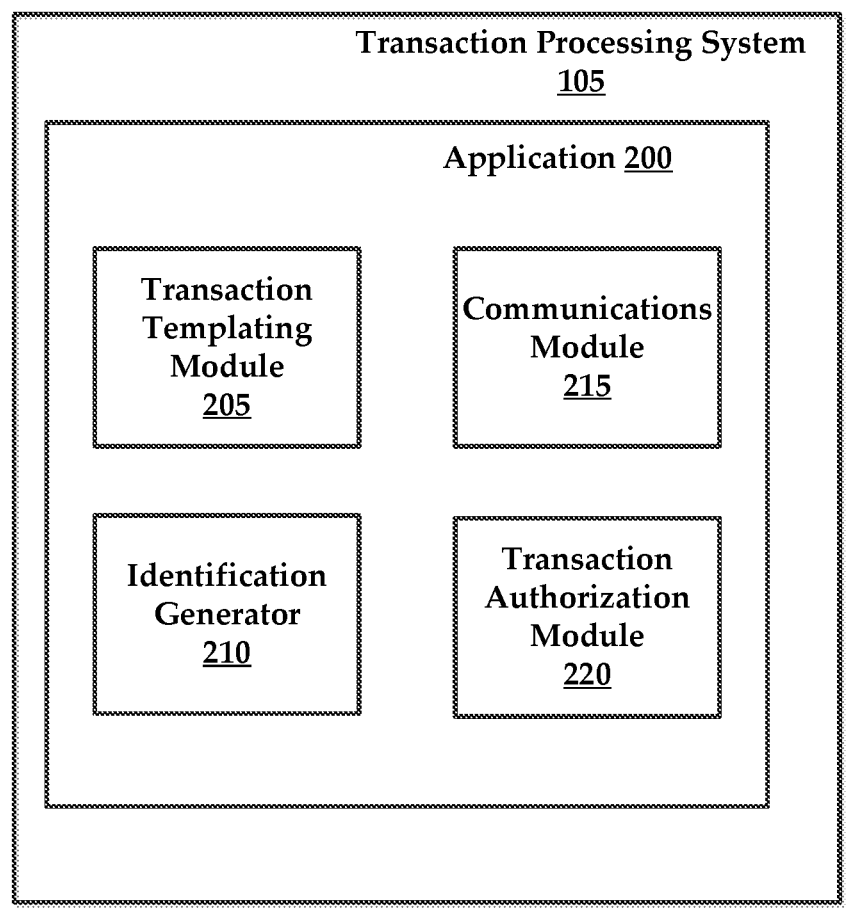
FIG. 2 illustrates an exemplary conversion application for facilitating at least a portion of a secure electronic financial transaction.

Referring now to FIG. 2, the transaction processing system 105 may generally comprise memory that includes executable instructions and a processor that executes the instructions stored in memory. Further details regarding exemplary memory and processor for the transaction processing system 105 are described relative to computing system 400 as described in FIG. 4.

According to some embodiments, the executable instructions may be embodied as an application 200. The application 200 may generally comprise a transaction templating module 205, an identification generator 210, a communications module 215, and a transaction authorization module 220. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules/engines/generators of the application 200 may include separately configured web servers. Also, the application 200 may be provisioned with a cloud as with the transaction processing system 105.

Prior to facilitating secure financial transactions between payors and payees, the transaction templating module 205 may be executed to define transaction specifications used by the transaction processing system 105. That is, the transaction templating module 205 may establish digital instruments that are accepted by the transaction processing system 105, and may be utilized by the payor and payee to conduct a secure financial transaction. Additionally, the identification generator 210 may be executed to generate a UPI for a payee.

Generally speaking, when a digital instrument that has been digitally signed by at least one payor has been received, along with a UPI, the underlying transaction specified in the digital instrument may be processed according to payment instructions included in the digital instrument. For example, a payment to the payee may be authorized in the digital instrument. The presence of the UPI may ensure that only authorized payees receive payment.

According to some embodiments, the transaction templating module 205 may maintain and utilize transaction templates that comprise a set of established transaction specifications. These transaction templates define a plurality of types of financial transactions that the transaction processing system 105 may process. While transaction templates have been contemplated, the present technology may utilize other data stores, abstractions, or collections of transaction data that define the type of transaction information (e.g., transaction specifications) that are to be collected from the payor and/or payee before authorization of payment can be made to the payee.

Stated otherwise, transaction specifications may comprise data types that are to be received from either the payor or the payee in order to facilitate a specific type of secure financial transaction, typically in the form of a digital instrument. Non-limiting examples of financial transactions may include payment for goods and/or services, installment contracts, mortgages, promissory notes, and so forth. Types of information that may be gathered include names, addresses, account numbers, payment, currency preferences, payment dates, and so forth. Therefore, for as many different types of financial transactions that may be conducted by different payors and payees, the transaction processing system 105 may employ combinations of transaction specifications.

In some instances, the payor and payee may register with the transaction processing system 105. Profiles for each payor and payee may be created. These profiles may include information that may be utilized by the transaction processing system 105 to generate digital instrument for a specific payor and payee combination. That is, in some embodiments, the digital instrument is a representation of a unique payment relationship between a payee and one or more payors. Because the digital instrument is unique to the payee and payor(s) and can be combined with a UPI, the digital instrument cannot be surreptitiously presented to the transaction processing system 105 by another party.

Once transaction templates have been generated by the transaction templating module 205, the application 200 awaits receipt of a transaction request from either a payor or a payee. In some instances, the transaction processing system 105 functions as an intermediary between the payor and payee. In other instances, the payor and payee may also communicate directly with one another.

In some embodiments, the identification generator 210 may be executed to generate a UPI each payee. The UPI may be used for transactions conducted between a payor and a payee. This uniquely identifying information, when presented along with a digital instrument, may ensure that the digital instrument is used to authorize payment to the correct payee.

In some instances the digital instrument may be generated by the payor and/or payee, rather than the transaction processing system 105. For example, the payee may provide to the transaction processing system 105 a digital instrument such as a contract that is to be used as the basis for consummating a transaction. The transaction processing system 105 may provide the digital instrument to one or more payors on behalf of the payee. A payor may utilize a program to digitally sign the digital instrument. This program may reside on the computing device associated with the payor (see FIG. 1). The signed digital instrument may be provided back to the transaction processing system 105, along with the UPI for the payee, for payment authorization. If the signed digital instrument comports with the requirements established for the payee, payment may be authorized to the payee.

From the above examples, it may be understood that the transaction processing system 105 may be the entity that establishes the requirements necessary for payment authorization. Alternatively, the payor or the payee may establish the requirements necessary for payment authorization, while the transaction processing system 105 effectuates the requirements established by the payor and the payee.

The digital instrument may comprise payment instructions that include transaction specifications as described above. That is, the digital instrument may include specific contract provisions that define the types of information that are to be gathered from the payor and payee. In some instances the digital instrument is a contract (e.g., digital instrument) that is based upon a set of transaction specifications. This digital instrument may be provided to the payor and the payee, where each party completes and digitally signs the digital instrument before securely transmitting the same back to the transaction processing system 105. Again, the present technology may employ one or more various types of cryptographic techniques for securing the digital instrument. In its simplest form, the digital instrument may specify a payment amount that is to be authorized to the payee.

A digital instrument may be utilized in conjunction with a single transaction, or may be utilized as the basis to perform many transactions. For example, the digital instrument may be used by a payor to purchase a single product from a payee. In other examples, the digital instrument may specify that the payee is authorized to request a set number of payments from the payor within a given period of time. For example, the payor may specify that the payee is allowed to request two payments from the payor each month. In other instances, the digital instrument may specify that the payee is authorized to request a particular payment amount from the payor within a given period of time. For example, the payor may authorize the payee to request up to five hundred dollars in payments each month. Alternatively, the payor may specify that the payee is to be paid at a defined point in the future (e.g. pre-dating the payment). In other embodiments, a payor may maintain a list of approved payees, where transaction requests that include a digital instrument for a payee on the list are automatically approved by the transaction authorization module 220.

According to other embodiments, payments may be apportioned between two or more payors, such as in a guarantor/guarantee relationship. A second payor may be obligated to pay a specified amount if a first payor fails to make a required payment. Likewise, a payor may obligate themselves to pay for products/services purchased by another party, which has limited or no payment responsibility to the payee.

For example, a parent (payor) may establish a list of approved merchants (payees) with which their child may conduct transactions. The payor may place various types of limits on the transactions such as amount, frequency, and so forth.

Generally speaking, the communications module 215 may allow the payor client device 110A and the payee client device 110B to interact with the application 200 to conduct financial transactions. In some instances, the communications module 215 may employ a web-based interface that is utilized by both payors and payees to conduct secure financial transactions.

The communications module 215 may authenticate the payor and payee devices before establishing a path of communications between the payor/payee and the application 200. Again, the communications module 215 may utilize PGP, SSL, or any other suitable method for establishing secure data transfer between computing devices.

The communications module 215 may await receipt of a transaction request from a payor or payee. The transaction request may include both the digital instrument that has been digitally signed by at least one payor, along with the UPI for the payee. Again, either the payor or payee may generate the digital instrument. If the digital instrument has been generated by the payor or payee, the transaction authorization module 220 may be executed to verify that the contents of the digital instrument complies with transaction specifications (e.g., a transaction template) established by the transaction processing system 105. That is, transaction authorization module 220 may compare the digital instrument received by the communications module 215 to transaction templates managed by the transaction templating module 205.

In some instances, the digital instrument may specify that a third party (such as an insurer) is to be queried to determine if the payment is insured by the insurer. For example, the transaction authorization module 220 may query an insurer for the payor to determine if a payment that corresponds to the payment specified in the digital instrument is covered by the payor's insurance policy.

If the transaction request is approved under the payment instructions included in the digital instrument, the transaction authorization module 220 may authorize the transaction. That is, the transaction authorization module 220 may authorize payment to be made to the payee from the one or more payors, according to further payment instructions included in the digital instrument. Again, authorization for payment may include providing an authorization signal to a financial institution (e.g., bank) that monetary funds should be provided to the payee.

Figure 3:
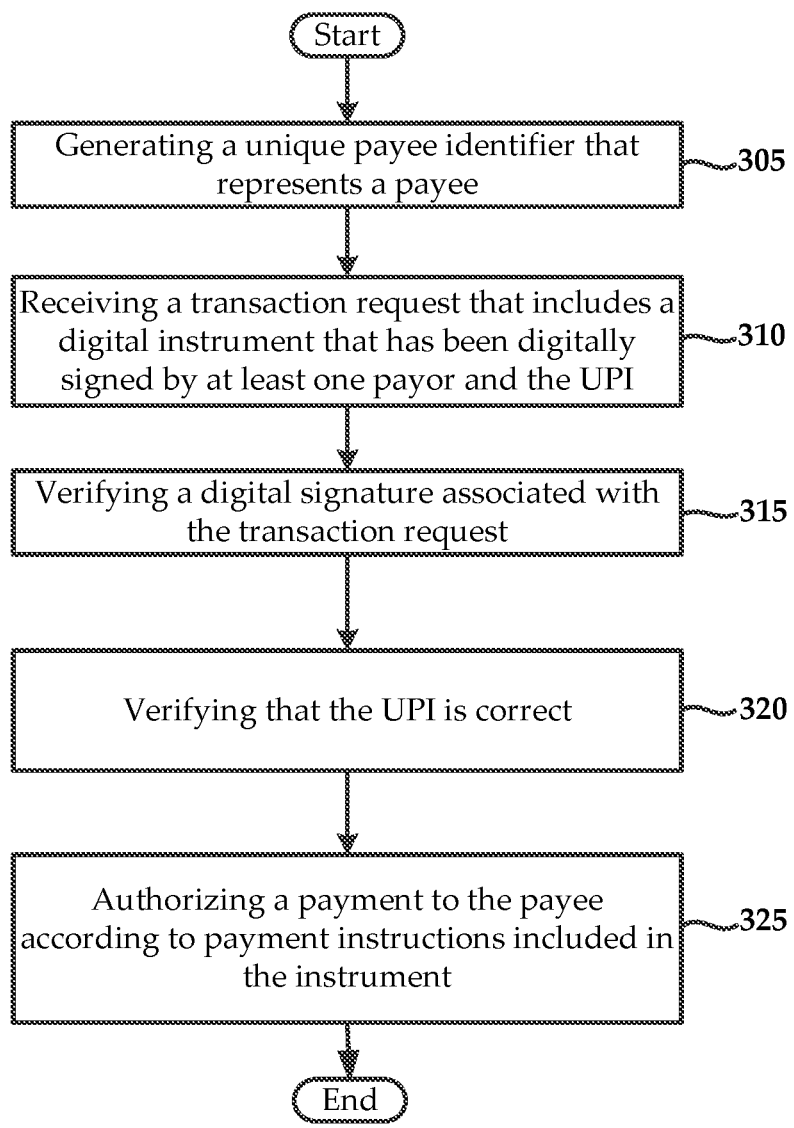
FIG. 3 is a flowchart of an exemplary method for facilitating at least a portion of a secure electronic financial transaction.

FIG. 3 illustrates a flowchart of an exemplary method for facilitating at least a portion of a secure financial transaction. The method may include a step 305 of generating a unique payee identifier that represents a payee. This UPI may be used as a verification mechanism to ensure that payments are being approved for the proper payee.

Next, the method may include a step 310 of receiving a transaction request. It is noteworthy that the transaction request may include an instrument that has been digitally signed by at least one payor and the UPI.

The method may include a step 315 of verifying a digital signature associated with the transaction request, along with a step 320 of verifying that the UPI is correct.

Next, the method may then include a step 325 of authorizing a payment to the payee according to payment instructions included in the instrument. It is noteworthy that the method may include fewer or more steps that those recited above.

Figure 4:
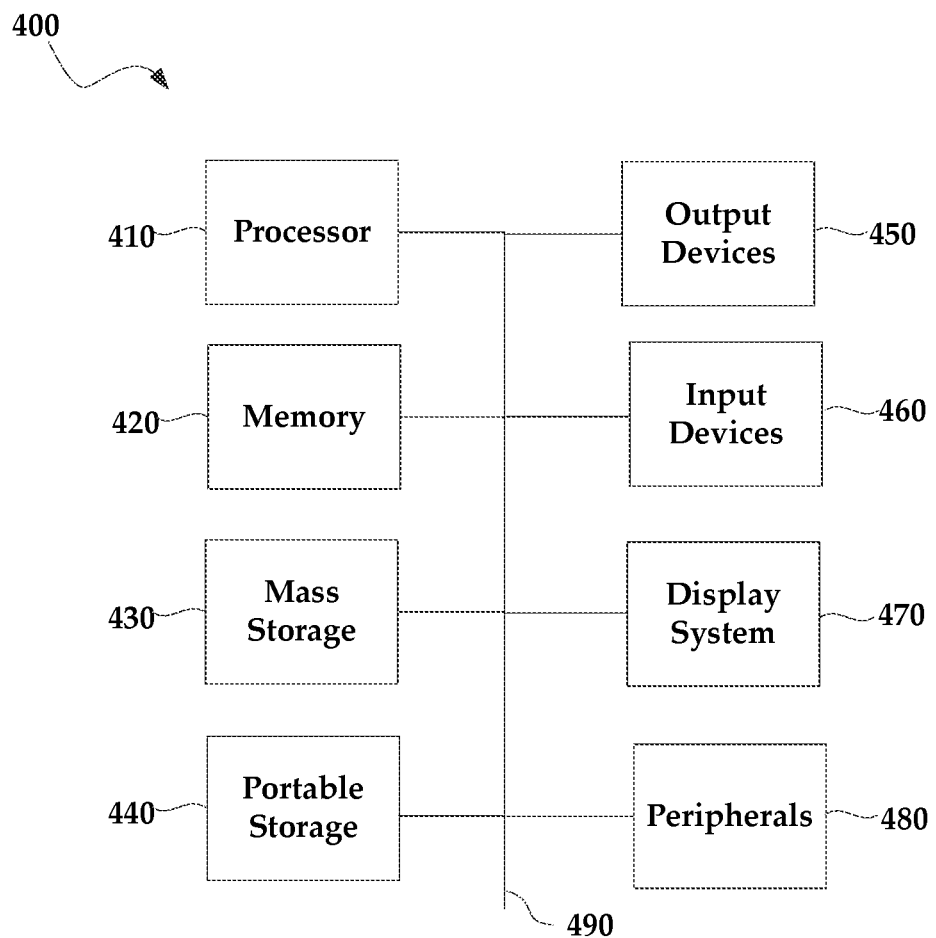
FIG. 4 illustrates an exemplary computing system that may be used to implement embodiments according to the present technology.

FIG. 4 illustrates an exemplary computing system 400 that may be used to implement the various embodiments of the present technology. The computing system 400 of FIG. 4 includes one or more processors 410 (hereinafter "processor unit") and memory 420 (hereinafter "main memory"). Main memory 420 stores, in part, instructions and data for execution by processor 410. Main memory 420 can store the executable code when the computing system 400 is in operation. The computing system 400 of FIG. 4 may further include a mass storage 430 (hereinafter "mass storage device"), portable storage 440 (hereinafter "portable storage device"), output devices 450, input devices 460, a display system 470, and other peripherals 480 (hereinafter "peripheral device(s)").

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the computing system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, nonvolatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

In the foregoing specification, the invention is described with reference to specific embodiments thereof, but those skilled in the art will recognize that the invention is not limited thereto. Various features and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for securing an electronic transaction, the method comprising:

prior to receiving an electronic transaction request, defining a transaction template that comprises a set of established transaction specifications that define contents of acceptable digital instruments and payment information to be collected from at least one of a payor and a payee prior to authorizing the electronic transaction request, the acceptable digital instruments further comprising transaction instructions that define how transactions between the payor and the payee are authorized, the transaction instructions being predefined by at least one of the payor and the payee, wherein only electronic transaction requests that correspond to the transaction template are available for authorization;

generating a unique identifier that represents the payee;

receiving the electronic transaction request, from a payor device associated with the payor, over a secure application programming interface, the electronic transaction request comprising a secure instrument, the secure instrument including a digital instrument that has been digitally signed with a digital signature by the payor and combined with the unique identifier to create the secure instrument that cannot be surreptitiously presented to an electronic transaction processing system by any other party, the digital signature being encrypted using an encryption type that is selected by a transaction processor;

determining that the electronic transaction request received from the payor includes the unique identifier that represents the payee;

verifying an identity of at least one of the payor and the payee using a digital security protocol;

verifying the digital signature using the selected encryption type;

comparing the electronic transaction request to the transaction template to determine that content of the secure instrument corresponds to the contents of the acceptable digital instruments and to collect, from the at least one of the payor and the payee, the payment information specified in the transaction template; and authorizing a transfer to the payee according to transaction instructions included in the secure instrument if the electronic transaction request corresponds with the transaction template and upon completing the secure instrument to include the payment information collected from the at least one of the payor and the payee.

2. The method according to claim 1, wherein the digital instrument comprises a contract used as a basis for consummating the electronic transaction, wherein the contract is based upon a set of transaction specifications.

3. The method according to claim 1, further comprising securing the digital instrument utilizing cryptography.

4. The method according to claim 1, wherein the digital signature comprises at least one of pretty good privacy (PGP) and secure socket layer (SSL) authentication.

5. The method according to claim 1, wherein the electronic transaction occurs within a video gaming environment.

6. The method according to claim 1, wherein the electronic transaction occurs within a social networking environment.

7. The method according to claim 1, wherein the electronic transaction is a payment.

8. The method according to claim 7, wherein the electronic transaction occurs within a virtual currency system.

9. The method according to claim 7, further comprising providing the authorized transfer to the payee.

10. The method according to claim 1, wherein the step of authorizing the transfer to the payee according to the transaction instructions included in the secure instrument occurs in a cloud-based computing environment.

11. The method according to claim 1, wherein the electronic transaction occurs within a cloud-based computing system.

12. A method for securing an electronic transaction, the method comprising:

prior to receiving an electronic transaction request, defining a transaction template that comprises a set of established transaction specifications that define contents of acceptable digital instruments and payment information to be collected from at least one of a first party and a second party prior to authorizing the electronic transaction request, the acceptable digital instruments further comprising transaction instructions that define how transactions between the first party and the second party are authorized, the transaction instructions being predefined by at least one of the first party and the second party, wherein only electronic transaction requests that correspond to the transaction template are available for authorization;

generating a unique identifier that represents the second party;

receiving the electronic transaction request from a first party's device over a secure application programming interface, the electronic transaction request comprising a secure instrument, the secure instrument including a digital instrument that has been digitally signed with a digital signature by the first party and combined with the unique identifier to create the secure instrument that cannot be surreptitiously presented to an electronic transaction processing system by any other party, the digital signature being encrypted using an encryption type that is selected by a transaction processor;

determining that the electronic transaction request received from the first party includes the unique identifier that represents the second party;

verifying an identity of the first party and the second party using a digital security protocol;

verifying the digital signature using the selected encryption type;

comparing the electronic transaction request to the transaction template to determine that content of the secure instrument corresponds to the contents of the acceptable digital instruments and to collect, from the at least one of the first party and the second party, the payment information specified in the transaction template; and authorizing a transfer to the second party according to transaction instructions included in the secure instrument if the electronic transaction request corresponds with the transaction template and upon completing the secure instrument to include the payment information collected from the at least one of the first party and the second party.

13. The method according to claim 12, wherein the digital instrument comprises a contract used as a basis for consummating the electronic transaction, wherein the contract is based upon a set of transaction specifications.

14. The method according to claim 12, further comprising securing the digital instrument utilizing cryptography.

15. The method according to claim 12, wherein the digital signature comprises at least one of pretty good privacy (PGP) and secure socket layer (SSL) authentication.

16. The method according to claim 12, wherein the electronic transaction occurs within a video gaming environment.

17. The method according to claim 12, wherein the electronic transaction occurs within a social networking environment.

18. The method according to claim 12, wherein the step of authorizing a transfer to the second party according to transaction instructions included in the secure instrument occurs in a cloud-based computing environment.

19. The method according to claim 12, wherein the electronic transaction occurs within a cloud-based computing system.

20. A system for securing an electronic transaction, the system comprising:

a processor configured to:

prior to receiving an electronic transaction request, define a transaction template that comprises a set of established transaction specifications that define contents of acceptable digital instruments and payment information to be collected from at least one of a payor and a payee prior to authorizing the electronic transaction request, the acceptable digital instruments further comprising transaction instructions that define how transactions between the payor and the payee are authorized, the transaction instructions being predefined by at least one of the payor and the payee, wherein only electronic transaction requests that correspond to the transaction template are available for authorization;

generate a unique identifier that represents the payee;

receive the electronic transaction request, from a payor device associated with the payor, over a secure application programming interface, the electronic transaction request comprising a secure instrument, the secure instrument including a digital instrument that has been digitally signed by the payor and combined with the unique identifier to create the secure instrument that cannot be surreptitiously presented to an electronic transaction processing system by any other party, the digital signature being encrypted using an encryption type that is selected by a transaction processor;

determine that the electronic transaction request received from the payor includes the unique identifier that represents the payee;

verify an identity of at least one of the payor and the payee using a digital security protocol;

verify the digital signature using the selected encryption type;

compare the electronic transaction request to the transaction template to determine that content of the secure instrument corresponds to the contents of the acceptable digital instruments and to collect, from the at least one of the payer and the payee, the payment information specified in the transaction template; and authorize a transfer to the payee according to transaction instructions included in the secure instrument if the electronic transaction request corresponds with the transaction template and upon completing the secure instrument to include the payment information collected from the at least one of the payor and the payee; and a memory for storing instructions executable by the processor.

* * * * *